US012482975B2

(12) United States Patent
Yang et al.

(10) Patent No.: US 12,482,975 B2
(45) Date of Patent: Nov. 25, 2025

(54) CABLE CONNECTOR AND CONNECTOR ASSEMBLY

(71) Applicant: AMPHENOL ASSEMBLETECH (XIAMEN) CO., LTD, Fujian (CN)

(72) Inventors: Wenchu Yang, Fujian (CN); Weishun Chen, Fujian (CN); Chungang Zhang, Fujian (CN); Zhenxing Liu, Fujian (CN); Haitao Xiong, Fujian (CN); Hang Li, Fujian (CN)

(73) Assignee: AMPHENOL ASSEMBLETECH (XIAMEN) CO., LTD, Xiamen (CN)

( * ) Notice: Subject to any disclaimer, the term of this patent is extended or adjusted under 35 U.S.C. 154(b) by 397 days.

(21) Appl. No.: 18/099,269

(22) Filed: Jan. 20, 2023

(65) Prior Publication Data

US 2023/0318215 A1 Oct. 5, 2023

(30) Foreign Application Priority Data

Mar. 31, 2022 (CN) ......................... 202220733343.9

(51) Int. Cl.
*H01R 12/79* (2011.01)
*H01R 12/77* (2011.01)
*H01R 13/627* (2006.01)
*H01R 13/631* (2006.01)

(52) U.S. Cl.
CPC ........... *H01R 12/79* (2013.01); *H01R 12/777* (2013.01); *H01R 13/6272* (2013.01); *H01R 13/631* (2013.01)

(58) Field of Classification Search
None
See application file for complete search history.

(56) References Cited

U.S. PATENT DOCUMENTS 8,770,990 B2 * 7/2014 Sytsma ................ H01R 13/504 439/76.1
11,088,481 B2 * 8/2021 Castiglione .......... H01R 13/516

* cited by examiner

*Primary Examiner* — Ross N Gushi

(57) ABSTRACT

Disclosed are a cable connector and a connector assembly. The cable connector includes a first insulator. A first electrical connection portion, a second electrical connection portion and a third electrical connection portion are sequentially arranged in the first insulator in a length direction thereof. The first electrical connection portion, the second electrical connection portion and the third electrical connection portion are connected to a first cable, a second cable and a third cable, respectively. One of the first electrical connection portion, the second electrical connection portion and the third electrical connection portion is a power supply connection portion, and at least one of the first electrical connection portion, the second electrical connection portion and the third electrical connection portion is a signal connection portion. The bottom of the first insulator is provided with a plugging portion and a first positioning portion extending downwards.

15 Claims, 7 Drawing Sheets

CABLE CONNECTOR AND CONNECTOR ASSEMBLY

CROSS REFERENCE TO RELATED APPLICATIONS

The present application claims the benefit of Chinese Patent Application No. 202220733343.9 filed on Mar. 31, 2022, the contents of which are incorporated herein by reference in their entirety.

FIELD OF TECHNOLOGY

The present invention belongs to the technical field of connectors, and in particular relates to a cable connector and a connector assembly.

BACKGROUND

At present, a high-speed connector is usually provided with only one terminal set and electrical connection portions. However, when multiple interfaces are required for plugging, the number of connectors needing to be used is large, leading to large overall space occupation, which is not conducive to product layout. Therefore, it is expected to develop a cable connector which can connect a plurality of electrical connection portions and has a compact structure.

SUMMARY

For the defects in the prior art, an objective of the present invention is to provide a cable connector and a connector assembly. A first electrical connection portion, a second electrical connection portion and a third electrical connection portion, including a power supply connection portion and a signal connection portion, are integrated by the cable connector, and thus the space is saved. A plugging portion and a first positioning portion are provided to be in plug-fit with a plugging slot and a positioning slot on a board connector, respectively. The arrangement of the first positioning portion provides further plugging positioning for the plugging of the cable connector, and the plugging stability is improved.

To achieve the objective above, the present invention provides a cable connector. The cable connector includes:

a first insulator, wherein a first electrical connection portion, a second electrical connection portion and a third electrical connection portion are sequentially arranged in the first insulator in a length direction thereof; the first electrical connection portion, the second electrical connection portion and the third electrical connection portion are connected to a first cable, a second cable and a third cable, respectively; one of the first electrical connection portion, the second electrical connection portion and the third electrical connection portion is a power supply connection portion, and at least one of the first electrical connection portion, the second electrical connection portion and the third electrical connection portion is a signal connection portion;

the bottom of the first insulator is provided with a plugging portion and a first positioning portion extending downwards.

Alternatively, the first electrical connection portion is a power supply connection portion, and the second electrical connection portion is a sideband signal connection portion.

Alternatively, the second electrical connection portion includes at least one of a sideband signal connection portion and a sideband signal connection portion.

Alternatively, one side of the first insulator is provided with a cable outlet, and the first cable, the second cable and the third cable extend outwards via the cable outlet.

Alternatively, at least the front side of the bottom of the first insulator is provided with the plugging portion, the plugging portion located on the front side of the bottom of the first insulator is provided with a lock latch, and the lock latch is provided with lock tabs.

Alternatively, the lock latch includes a lock plate bent into a U shape, one face of the lock plate is clamped into a lock groove formed in the surface of the plugging portion, and the other face of the lock plate is a free end exposed to the outside. The two lock tabs are arranged on the outer side of the other face of the lock plate, and the upper end of the other face of the lock plate is provided with a pull tab.

Alternatively, the plugging portion includes a pair of first plugging portions and at least one pair of second plugging portions. The pair of first plugging portions are located on both sides of the first electrical connection portion and the second electrical connection portion, and each pair of second plugging portions are located on both sides of the third electrical connection portion. The first positioning portion is located between the first plugging portion and the second plugging portion adjacent to the first plugging portion.

Alternatively, the cable connector further includes a printed circuit board. The lower portion of the printed circuit board extends downwards to form a first plugboard portion and a second plugboard portion, and a first clearance is provided between the first plugboard portion and the second plugboard portion. The first electrical connection portion and the second electrical connection portion are arranged on the first plugboard portion at an interval, and the third electrical connection portion is arranged on the second plugboard portion. There are at least two third electrical connection portions, the at least two third electrical connection portions are spaced from each other, and a second clearance is provided between the adjacent third electrical connection portions.

Alternatively, at least two pairs of second plugging portions are provided, and a third clearance is provided between the adjacent second plugging portions in a length direction of the first insulator.

Alternatively, the front side face of the first insulator is provided with a protruded portion, and the first plugging portion and the first positioning portion are arranged at the bottom of the protruded portion; and/or a fourth clearance is provided between the first positioning portion and the first plugging portion as well as between the first positioning portion and the second plugging portion.

Alternatively, the bottoms of the left side face and the right side face of the first insulator are provided with second positioning portions extending downwards, and a fifth clearance is provided between the second positioning portion and the plugging portion. The second positioning portion is platy.

Alternatively, the plugging portion is platy, and the first positioning portion is columnar.

Alternatively, the plugging portion includes one first plugging portion and at least one pair of second plugging portions. The first plugging portion is located on one side of the first electrical connection portion, or located on one side of the first electrical connection portion and one side of the second electrical connection portion, and each pair of second plugging portions are located on both sides of the third electrical connection portion. The first positioning portion is located between the first plugging portion and the second plugging portion.

Alternatively, the cable connector further includes a printed circuit board. A lower portion of the printed circuit board extends downwards to form a first plugboard portion and a second plugboard portion, and a first clearance is provided between the first plugboard portion and the second plugboard portion. The first electrical connection portion and the second electrical connection portion are arranged on the first plugboard portion at an interval, and the third electrical connection portion is arranged on the second plugboard portion. One third electrical connection portion is provided.

Alternatively, the cable outlet is formed in the top of the first insulator.

Alternatively, one plugging portion and one first positioning portion are provided, respectively. The plugging portion and the positioning portion are both arranged on the left side or the right side of the first electrical connection portion, the second electrical connection portion and the third electrical connection portion.

Alternatively, the cable connector further includes a printed circuit board. A lower portion of the printed circuit board extends downwards to form an integrated plugboard portion; and the first electrical connection portion, the second electrical connection portion and the third electrical connection portion are arranged on the plugboard portion at an interval.

Alternatively, there are a pair of plugging portions and a pair of first positioning portions.

The present invention further provides a connector assembly, which includes the cable connector above and a board connector.

Alternatively, the board connector includes:

a second insulator, wherein a first terminal set, a second terminal set and a third terminal set are sequentially arranged in the second insulator in a length direction thereof, the first terminal set, the second terminal set and the third terminal set are in plug-fit with the first electrical connection portion, the second electrical connection portion and the third electrical connection portion, respectively; and a housing, sleeved outside the second insulator, wherein a plugging slot is formed between at least one of the front side face and the rear side face of the second insulator and the housing, at least part of the front end face and/or rear end face of the housing is recessed inwards to form a positioning slot, the plugging slot is in plug-fit with the plugging portion, and the positioning slot is in plug-fit with the first positioning portion.

The cable connector and connector assembly provided by the present invention have the beneficial effects as follows: The first electrical connection portion, the second electrical connection portion and the third electrical connection portion, including a power supply connection portion and a signal connection portion, are integrated by the cable connector, and thus the space is saved. The plugging portion and the first positioning portion are provided to be in plug-fit with the plugging slot and the positioning slot on the board connector, respectively. The arrangement of the first positioning portion provides further plugging positioning for the plugging of the cable connector, and the plugging stability is improved.

Other features and advantages of the invention will be described in detail in the detailed description which follows.

BRIEF DESCRIPTION OF THE DRAWINGS

The above and other objects, features and advantages of the present invention will become more apparent from a more detailed description of exemplary embodiments of the present invention with combination of the accompanying drawings, wherein the same reference numerals generally refer to the same portions in the exemplary embodiments of the present invention.

In the drawings.

Figure 1:
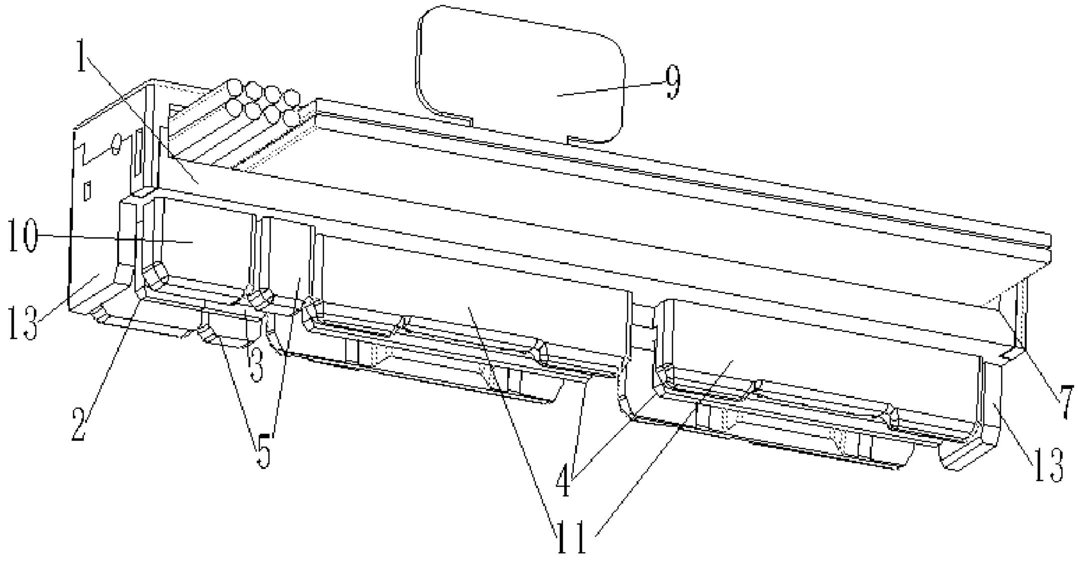
FIG. 1 shows a schematic diagram of a three-dimensional structure of a cable connector in accordance with a first embodiment of the present invention from one perspective.

1—First insulator; 2—first electrical connection portion; 3—second electrical connection portion; 4—third electrical connection portion; 5—first positioning portion; 6—lock tab; 7—cable outlet; 8—lock latch; 9—pull tab; 10—first plugging portion; 11—second plugging portion; 12—protruded portion; 13—second positioning portion; 14—housing; 15—lock hole; 16—positioning slot

DESCRIPTION OF THE EMBODIMENTS

Preferred embodiments of the present invention will be described in more detail below. While the present invention has been described in terms of the preferred embodiments of the present invention, it should be understood that the present invention may be embodied in a variety of forms and should not be limited by the embodiments set forth herein. Rather, these embodiments are provided so that this disclosure will be thorough and complete, and the scope of the present invention may be fully conveyed to those skilled in the art.

The present invention provides a cable connector. The cable connector includes:

- a first insulator, wherein a first electrical connection portion, a second electrical connection portion and a third electrical connection portion are sequentially arranged in the first insulator in a length direction thereof; the first electrical connection portion, the second electrical connection portion and the third electrical connection portion are connected to a first cable, a second cable and a third cable, respectively; one of the first electrical connection portion, the second electrical connection portion and the third electrical connection portion is a power supply connection portion, and at least one of the first electrical connection portion, the second electrical connection portion and the third electrical connection portion is a signal connection portion.

The bottom of the first insulator is provided with a plugging portion and a first positioning portion extending downwards.

Specifically, the first electrical connection portion, the second electrical connection portion and the third electrical connection portion, including a power supply connection portion and a signal connection portion, are integrated by the cable connector, which not only achieves the integration of the number of terminal sets, but also achieves the integration and expansion of functions of the terminal sets, thus the space is saved, the layout is facilitated. The plugging portion may be in plug-fit with the plugging slot on a board connector. A first positioning portion can be in plug-fit with a positioning slot on the board connector, thus providing further plugging positioning for the plugging of the cable connector and improving the plugging stability.

Further, a lock tab of the cable connector can be clamped into a lock hole on the board connector to achieve the clamping and fixation of the cable connector.

Alternatively, the first electrical connection portion is a power supply connection portion, and the second electrical connection portion is a sideband signal connection portion.

Specifically, the cable connector achieves the integration of power supply connection and sideband signal connection through the arrangement of the power supply connection portion and the sideband signal connection port. The function of the cable connector is expanded, the multi-functional integrated design is achieved, and the integration of the functions of the electrical connector is achieved on the basis of achieving the integration of the number of the electrical connection portions.

Alternatively, the third electrical connection portion includes at least one of the sideband signal connection portion and the differential signal connection portion.

Specifically, at least one of a sideband signal and a differential signal can be selected as a signal transmitted by the third electrical connection portion as required, thus achieving the diversity of signal transmission.

Alternatively, one side of the first insulator is provided with a cable outlet, and the first cable, the second cable and the third cable extend outwards via the cable outlet.

Specifically, the cable connectors may be divided into a front-outlet connector and a rear-outlet connector according to different outlet directions.

Alternatively, at least the front side of the bottom of the first insulator is provided with a plugging portion, the plugging portion located on the front side of the bottom of the first insulator is provided with a lock latch, and the lock latch is provided with a lock tab.

Specifically, the plugging portion located on the front side of the first insulator is provided with the lock latch, then the cable outlet is located on the rear side of the first insulator to form a rear-outlet connector, otherwise, the cable outlet is located on the front side of the first insulator to form a front-outlet connector. The lock latch and the cable outlet are respectively located on both sides of the first insulator to facilitate the operation of the lock latch.

In an example, the rear side of the first insulator is also provided with a plugging portion.

Alternatively, the lock latch includes a lock plate bent into a U shape, one face of the lock plate is clamped into a lock groove formed in the surface of the plugging portion, and the other face of the lock plate is a free end exposed to the outside. Two lock tabs are arranged on the outer side of the other face of the lock plate, and the upper end of the other face of the lock plate is provided with a pull tab.

Specifically, the lock plate bent into the U shape is elastic. When the pull tab is pulled or the other face of the lock plate is pressed, the lock tabs on the other face of the lock plate may be driven to retract from lock holes on the board connector, and the cable connector may be unplugged at the moment.

Alternatively, the plugging portion includes a pair of first plugging portions and at least one pair of second plugging portions. The pair of first plugging portions are located on both sides of the first electrical connection portion and the second electrical connection portion; each pair of second plugging portions are located on both sides of the third electrical connection portion, and the first positioning portion is located between the first plugging portion and the second plugging portion adjacent to the first plugging portion.

Specifically, the first plugging portion, the first positioning portion and the second plugging portion are sequentially arranged in a length direction of the first insulator to form a plurality of relatively independent plugging and unplugging structures, thus improving the plugging stability.

In another example, the first plugging portion may also be located only on one side of the first electrical connection portion and one side of the second electrical connection portion. The second plugging portion may also be located only on one side of the third electrical connection portion, and the number of the first positioning portions may also be one.

Alternatively, the cable connector further includes a printed circuit board. A lower portion of the printed circuit board extends downwards to form a first plugboard portion and a second plugboard portion, and a first clearance is provided between the first plugboard portion and the second plugboard portion. The first electrical connection portion and the second electrical connection portion are arranged on the first plugboard portion at an interval, and the third electrical connection portion is arranged on the second plugboard portion. There are at least two third electrical connection portions, the at least two third electrical connection portions are spaced from each other, and a second clearance is provided between the adjacent third electrical connection portions.

Specifically, the first electrical connection portion, the second electrical connection portion and the third electrical connection portion are integrated on the same printed circuit board. The circuit board is provided with a first plugboard portion and a second plugboard portion extending downwards. The first plugboard portion and the second plugboard portion are both provided with gold fingers to be plugged into the terminal sets on the board connector. The first electrical connection portion and the second electrical connection portion are arranged on the same first plugboard portion with sufficient electrical clearance kept therebetween. Sufficient electrical clearance is kept between the adjacent third electrical connection portions through the second clearance. Moreover, different third electrical connection portions are located on different second plugboard portions to form a plurality of plugging and unplugging structures, thus guaranteeing the plugging and unplugging stability.

Alternatively, there are at least two pairs of second plugging portions, and a third clearance is provided between the adjacent second plugging portions in a length direction of the first insulator.

Specifically, the two adjacent second plugging portions are spaced from each other to form plugging and plugging structures independent of each other, thus improving the plugging and unplugging stability.

Alternatively, the front side face of the first insulator is provided with a protruded portion, and the first plugging portion and the first positioning portion are arranged at the bottom of the protruded portion; and/or a fourth clearance is provided between the first positioning portion and the first plugging portion as well as between the first positioning portion and the second plugging portion.

Specifically, in order to adapt to the dimension of a housing where a first terminal set and a second terminal set of the board connector are located, the end face of the first insulator is provided with a protruded portion, and the first plugging portion and the first positioning portion are located at the bottom of the protruded portion, and the first plugging portion and the first positioning portion protrude outwards compared to the second plugging portion.

Alternatively, the bottoms of the left side face and the right side face of the first insulator are provided with second positioning portions extending downwards, and a fifth clearance is provided between the second positioning portion and the plugging portion. The second positioning portion is platy.

Specifically, when the cable connector is plugged into the corresponding board connector, the two second positioning portions are respectively attached to the outer side of the housing of the board connector to play a role in plugging-unplugging positioning and guiding thus further improving the plugging stability.

Alternatively, the plugging portion is platy, and the first positioning portion is columnar.

Alternatively, the plugging portion includes a first plugging portion and at least a pair of second plugging portions. The first plugging portion is located on one side of the first electrical connection portion or located on one side of the first electrical connection portion and one side of the second electrical connection portion; each pair of second plugging portions are located on both sides of the third electrical connection portion, and the first positioning portion is located between the first plugging portion and the second plugging portion.

Specifically, there may be one pair, two pairs or multiple pairs of second plugging portions.

Alternatively, the cable connector further includes a printed circuit board. A lower portion of the printed circuit board extends downwards to form a first plugboard portion and a second plugboard portion, and a first clearance is provided between the first plugboard portion and the second plugboard portion. The first electrical connection portion and the second electrical connection portion are arranged on the first plugboard portion at an interval, and the third electrical connection portion is arranged on the second plugboard portion. There is one third electrical connection portion.

Alternatively, the cable outlet is formed in the top of the first insulator.

Alternatively, there is a plugging portion and a first positioning portion, respectively. The plugging portion and the positioning portion are both arranged on the left side or the right side of the first electrical connection portion, the second electrical connection portion and the third electrical connection portion.

Alternatively, the cable connector further includes a printed circuit board. A lower portion of the printed circuit board extends downwards to form an integrated plugboard portion; and the first electrical connection portion, the second electrical connection portion and the third electrical connection portion are arranged on the plugboard portion at an interval.

Alternatively, there is a pair of plugging portions and a pair of first positioning portions, respectively.

The present invention further provides a connector assembly, which includes the cable connector above and a board connector.

Alternatively, the board connector includes:

a second insulator, wherein a first terminal set, a second terminal set and a third terminal set are sequentially arranged in the second insulator in a length direction thereof, the first terminal set, the second terminal set and the third terminal set are in plug-fit with the first electrical connection portion, the second electrical connection portion and the third electrical connection portion, respectively;

a housing, sleeved outside the second insulator, wherein a plugging slot is formed between at least one of the front side face and the rear side face of the second insulator and the housing, at least part of the front end face and/or rear end face of the housing is recessed inwards to form a positioning slot, the plugging slot is in plug-fit with the plugging portion, and the positioning slot is in plug-fit with the first positioning portion.

Specifically, the cable connector is an integrated cable connector. When the cable connector is plugged into the board connector above, the plugging portion is plugged into the plugging slot, and the first positioning portion is plugged into the positioning slot so as to achieve the plugging and fixation of the cable connector to the board connector.

First Embodiment

Figure 2:
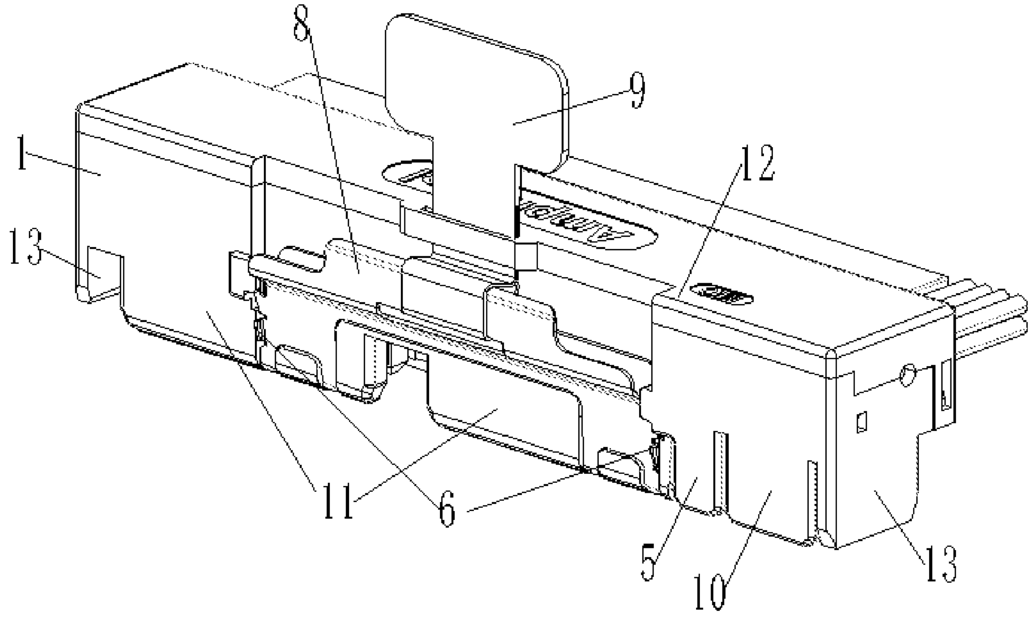
FIG. 2 shows a schematic diagram of a three-dimensional structure of a cable connector in accordance with a first embodiment of the present invention from another perspective.

As shown in FIG. 1 and FIG. 2, the present invention provides a cable connector. The cable connector includes:

a first insulator 1, wherein a first electrical connection portion 2, a second electrical connection portion 3 and a third electrical connection portion 4 are sequentially arranged in the first insulator 1 in a length direction thereof; the first electrical connection portion 2, the second electrical connection portion 3 and the third electrical connection portion 4 are connected to a first cable, a second cable and a third cable, respectively; one of the first electrical connection portion 2, the second electrical connection portion 3 and the third electrical connection portion 4 is a power supply connection portion, and at least one of the first electrical connection portion 2, the second electrical connection portion 3 and the third electrical connection portion 4 is a signal connection portion.

The bottom of the first insulator 1 is provided with a plugging portion and a first positioning portion 5 extending downwards.

In accordance with the embodiment, the first electrical connection portion 2 is a power supply connection portion, and the second electrical connection portion 3 is a sideband signal connection portion.

In accordance with the embodiment, the third electrical connection portion 4 includes at least one of a sideband signal connection portion and a differential signal connection portion.

In accordance with the embodiment, one side of the first insulator 1 is provided with a cable outlet 7, and the first cable, the second cable and the third cable extend outwards via the cable outlet 7.

In accordance with the embodiment, the cable outlet 7 is arranged on the front side or the rear side of the first insulator 1.

In accordance with the embodiment, at least the front side of the bottom of the first insulator 1 is provided with a plugging portion, the plugging portion located on the front side of the bottom of the first insulator 1 is provided with a lock latch 8, and the lock latch 8 is provided with lock tabs 6.

Figure 3:
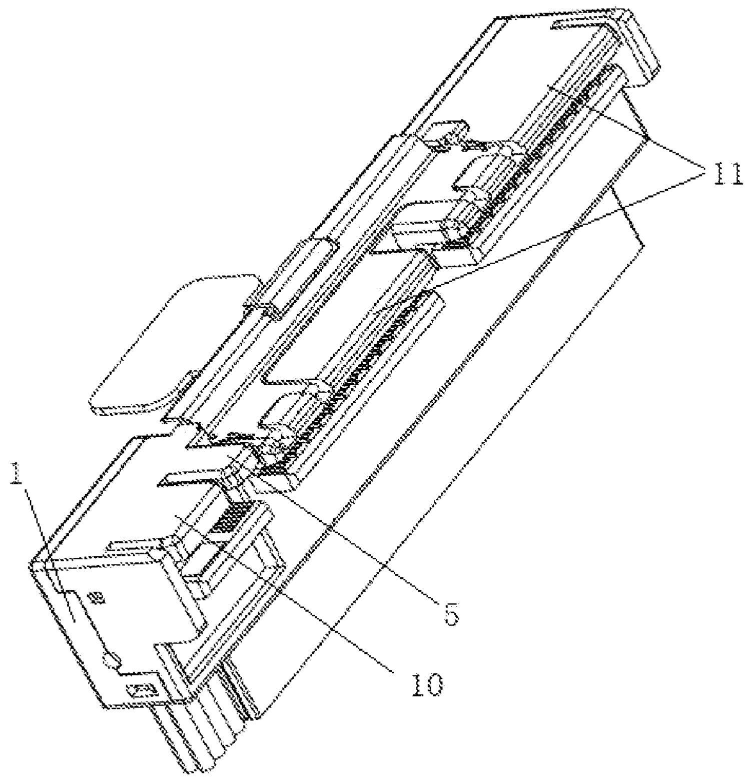
FIG. 3 shows a schematic diagram of a three-dimensional structure of another cable connector in accordance with a first embodiment of the present invention.

As shown in FIG. 3, the cable connector may be provided with the plugging portion only on the front side of the bottom of the first insulator 1.

In accordance with the embodiment, the lock latch 8 includes a lock plate bent into a U shape. One face of the lock plate is clamped into a lock groove formed in the surface of the plugging portion, and the other face of the lock plate is a free end exposed to the outside. The two lock tabs 6 are arranged on the outer side of the other face of the lock plate, and the upper end of the other face of the lock plate is provided with a pull tab 9.

In accordance with an embodiment, the plugging portion includes a pair of first plugging portions 10 and two pairs of second plugging portions 11. The pair of first plugging portions 10 are located on both sides of the first electrical connection portion 2 and the second electrical connection portion 3; each pair of second plugging portions 11 are located on both sides of the third electrical connection portion 4, and the first positioning portion 5 is located between the first plugging portion 10 and the second plugging portion 11 adjacent to the first plugging portion.

In accordance with an embodiment, the cable connector further includes a printed circuit board. A lower portion of the printed circuit board extends downwards to form a first plugboard portion and a second plugboard portion, and a first clearance is provided between the first plugboard portion and the second plugboard portion. The first electrical connection portion 2 and the second electrical connection portion 3 are arranged on the first plugboard portion at an interval, and the third electrical connection portion 4 is arranged on the second plugboard portion. There are two third electrical connection portions 4, the two third electrical connection portions 4 are spaced from each other, and a second clearance is provided between the adjacent third electrical connection portions 4.

In accordance with the embodiment, there are at least two pairs of second plugging portions 11, and a third clearance is provided between the adjacent second plugging portions 11 in a length direction of the first insulator 1.

In accordance with the embodiment, the front side face of the first insulator 1 is provided with a protruded portion 12, and the first plugging portion 10 and the first positioning portion 5 are arranged at the bottom of the protruded portion 12; and/or a fourth clearance is provided between the first positioning portion 5 and the first plugging portion 10 as well as between the first positioning portion 5 and the second plugging portion 11.

In accordance with the embodiment, the bottoms of the left side face and the right side face of the first insulator 1 are provided with second positioning portions 13 extending downwards, and a fifth clearance is provided between the second positioning portion 13 and the plugging portion. The second positioning portion 13 is platy.

In accordance with the embodiment, the plugging portion is platy, and the first positioning portion 5 is columnar.

In conclusion, the first electrical connection portion, the second electrical connection portion and the third electrical connection portion in the same first insulator 1, including a power supply connection portion and a differential signal connection portion, are integrated in the same first insulator 1 by the cable connector provided by the present invention, thus the multi-functional integrated design of interfaces of the cable connector is achieved, the space is saved, and the product layout is facilitated. Moreover, the plugging portion can be in plug-fit with the plugging slot on the board connector; during plugging, the lock tabs 6 can be clamped into the lock holes 15 on the board connector to achieve the clamping and fixing of the cable connector. The arrangement of the first positioning portion 5 and the second positioning portion 13 provides further plugging positioning for the plugging of the cable connector, and the plugging stability is improved.

Second Embodiment

Figure 4:
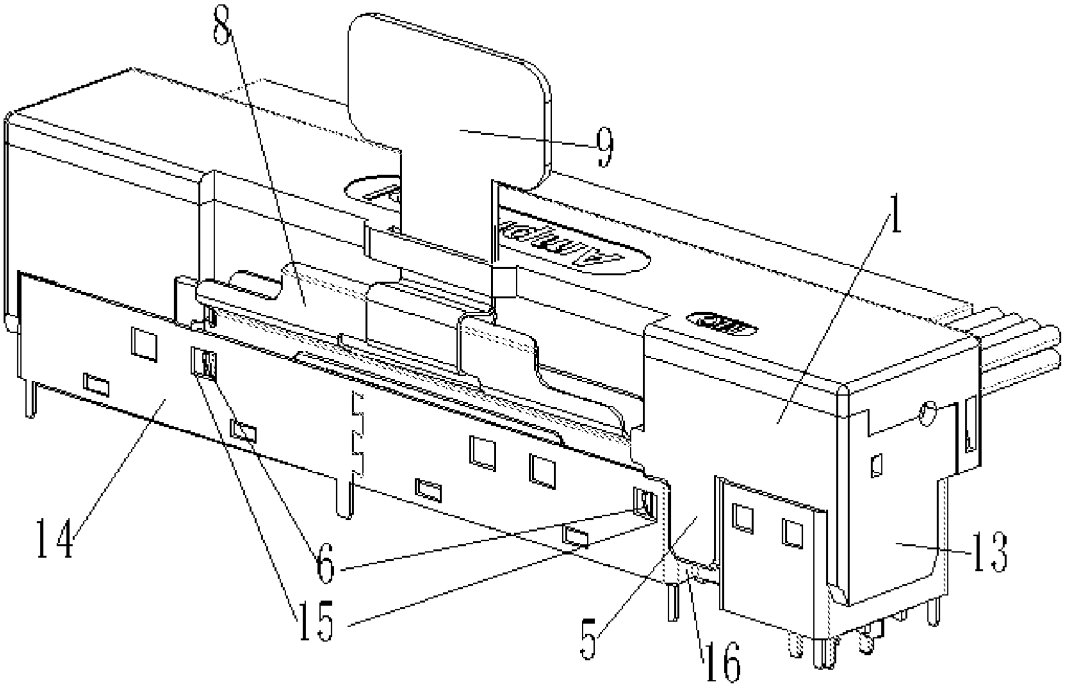
FIG. 4 shows a schematic diagram of a structure of a connector assembly in accordance with a second embodiment of the present invention when plugged with a rear-outlet cable connector.
Figure 5:
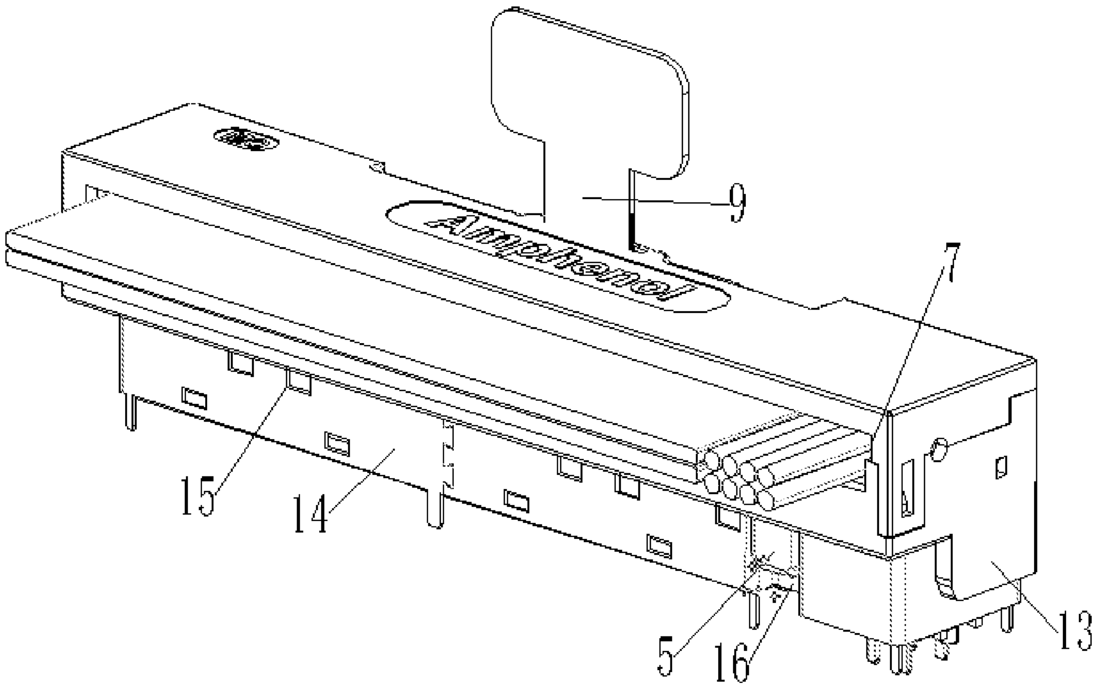
FIG. 5 shows a schematic diagram of a structure of a connector assembly in accordance with a second embodiment of the present invention when plugged with a front-outlet cable connector.

As shown in FIG. 4 and FIG. 5, the present invention further provides a connector assembly, which includes the cable connector above and a board connector.

In accordance with the embodiment, the board connector includes:

a second insulator, wherein a first terminal set, a second terminal set and a third terminal set are sequentially arranged in the second insulator in a length direction thereof, and the first terminal set, the second terminal set and the third terminal set are in plug-fit with the first electrical connection portion, the second electrical connection portion and the third electrical connection portion, respectively;

a housing 14, sleeved outside the second insulator, wherein a plugging slot is formed between at least one of the front side face and the rear side face of the second insulator and the housing 14, at least part of the front end face and/or rear end face of the housing is recessed inwards to form a positioning slot 16, the plugging slot is in plug-fit with the plugging portion, and the positioning slot is in plug-fit with the first positioning portion 5.

Specifically, the front and rear end faces of the housing 14 are provided with lock holes 15. As the board connector integrated with the first terminal set, the second terminal set and the third terminal set is used by the connector assembly to be in plug-fit with the cable connector above, the transmission of power supply signals, sideband signals and differential signals is achieved. Therefore, the connector assembly achieves the integrated plugging and unplugging, which is not only saved in space and easy to assemble, but also can keep the outlet cables neat. The lock tabs 6 of the cable connector can be clamped into the lock holes 15 on the board connector to achieve the clamping and fixation of the cable connector. The first positioning portion 5 is in plug-fit with the positioning slot 16 to provide further plugging positioning for the plugging of the cable connector, and the plugging stability is improved.

Third Embodiment

Figure 6:
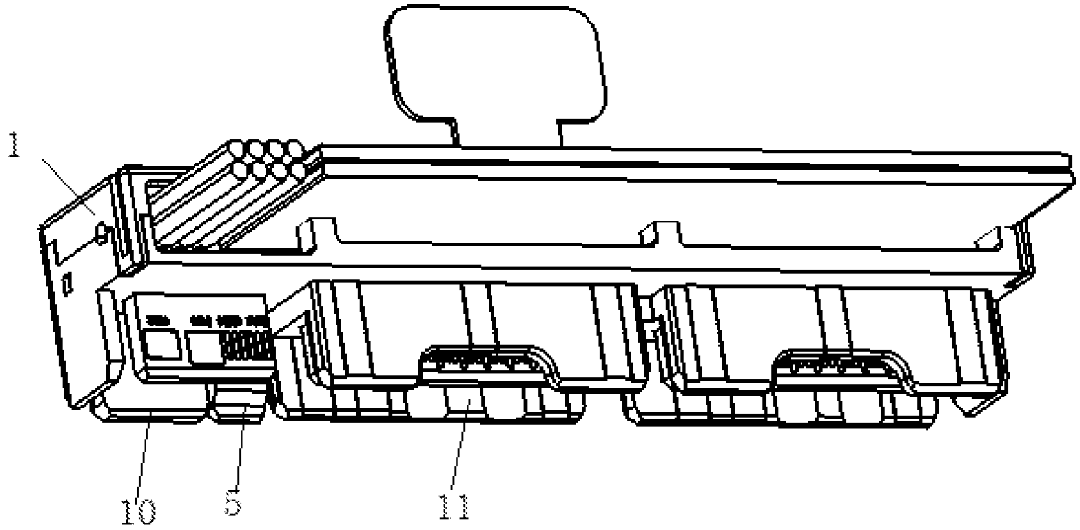
FIG. 6 shows a schematic diagram of a three-dimensional structure of a cable connector in accordance with a third embodiment of the present invention from one perspective.
Figure 7:
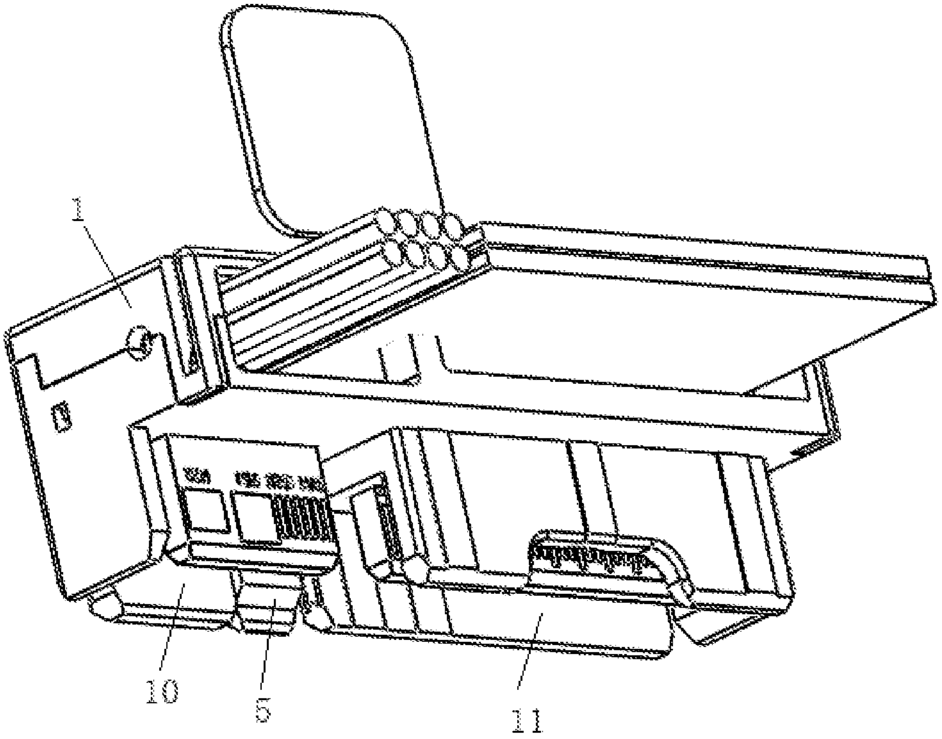
FIG. 7 shows a schematic diagram of a three-dimensional structure of another cable connector in accordance with a third embodiment of the present invention from one perspective.

As shown in FIG. 6 and FIG. 7, the difference between the embodiment and the first embodiment is as follows:

In accordance with an embodiment, the plugging portion includes a first plugging portions 10 and at least a pair of second plugging portions 11. The first plugging portion 10 is located on one side of the first electrical connection portion 2 or is located on one side of the first electrical connection portion 2 and one side of the second electrical connection portion 3; each pair of second plugging portions 11 are located on both sides of the third electrical connection portion 4, and the first positioning portion 5 is located between the first plugging portion 10 and the second plugging portion 11.

Specifically, as shown in FIG. 6, the cable connector may include two third electrical connection portions 4, and there are two pairs of second plugging portions 11. As shown in FIG. 7, the cable connector may also include a third electrical connection portion 4, and there is also a pair of second plugging portions 11.

In accordance with an embodiment, the cable connector further includes a printed circuit board. A lower portion of the printed circuit board extends downwards to form a first plugboard portion and a second plugboard portion, and a first clearance is provided between the first plugboard portion and the second plugboard portion. The first electrical connection portion 2 and the second electrical connection portion 3 are arranged on the first plugboard portion at an interval, and the third electrical connection portion 4 is arranged on the second plugboard portion. There is one third electrical connection portion 4.

Specifically, the cable connector in the embodiment is only provided with one third electrical connection portion 4 on the second plugboard portion. Correspondingly, only a pair of second plugging portions 11 are arranged on both sides of the third electrical connection portions 4. The size of the cable connector is smaller than that of the cable connector in the first embodiment, and then the first plugging portion 10 may be only arranged on one side of the first plugboard portion to guarantee the plugging strength and plugging stability.

Figure 8:
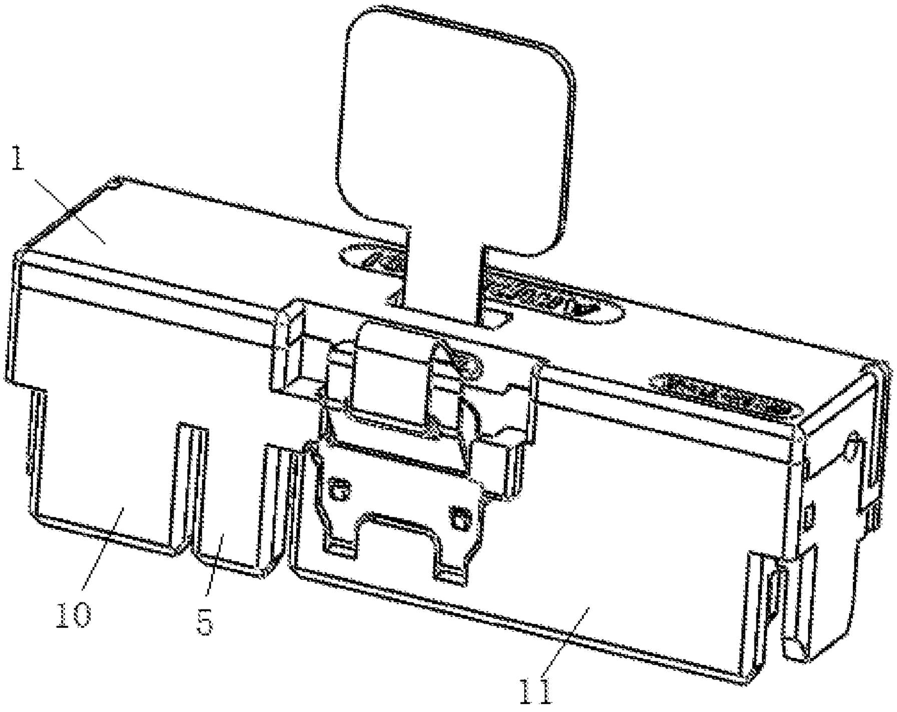
FIG. 8 shows a schematic diagram of a three-dimensional structure of another cable connector in accordance with a third embodiment of the present invention from another perspective.

Furthermore, in order to adapt to the cable connector in the embodiment, the lock latch structure is as shown in FIG. 8.

Fourth Embodiment

Figure 9:
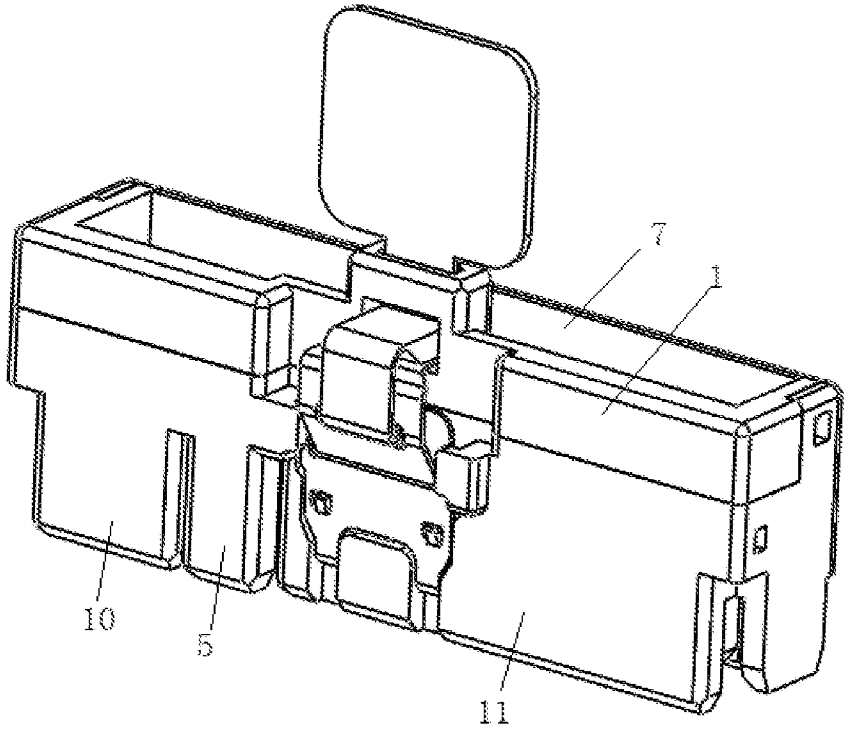
FIG. 9 shows a schematic diagram of a three-dimensional structure of a cable connector in accordance with a fourth embodiment of the present invention.

As shown in FIG. 9, the difference between the embodiment and the first embodiment is as follows:

In accordance with the embodiment, the cable outlet 7 is formed in the top of the first insulator 1.

Specifically, the cable connector may achieve top vertical outgoing through the cable outlet 7, so that the plugging space can be saved more during use, and more cable connectors may be plugged into a plugging region with the same area.

Figure 10:
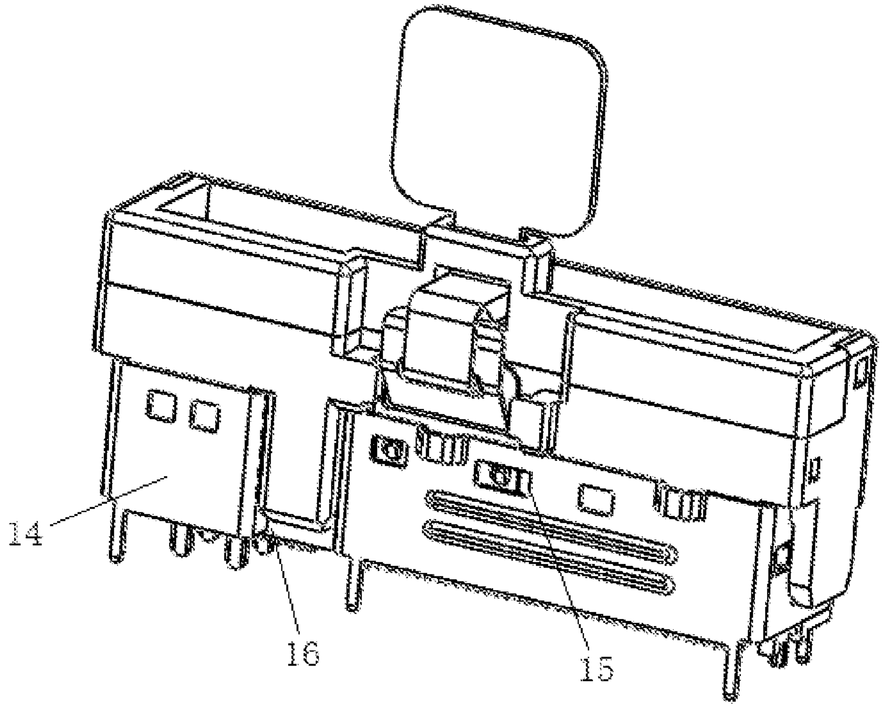
FIG. 10 shows a schematic diagram of a three-dimensional structure of a connector assembly in accordance with a fourth embodiment of the present invention.

Furthermore, the cable connector in the embodiment can be in plug-fit with the corresponding board connector thereof to form a connector assembly as shown in FIG. 10.

Fifth Embodiment

Figure 11:
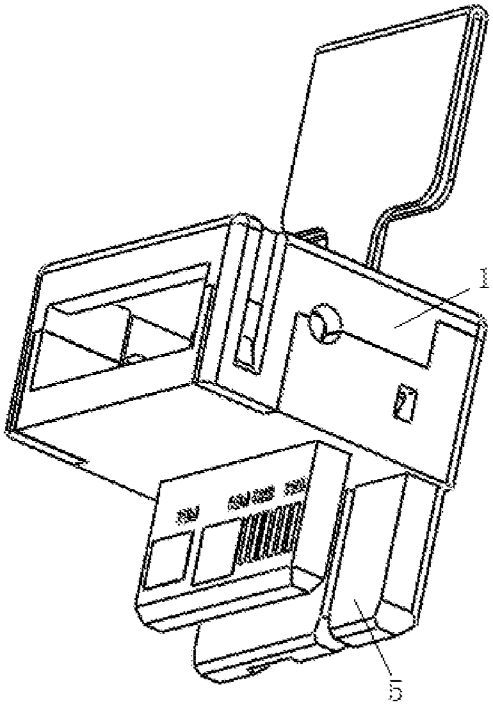
FIG. 11 shows a schematic diagram of a three-dimensional structure of a cable connector in accordance with a fifth embodiment of the present invention.

As shown in FIG. 11, the difference between the embodiment and the first embodiment is as follows:

In accordance with the embodiment, there is one plugging portion and one first positioning portion 5, respectively. The plugging portion and the positioning portion 5 are both arranged on the left side or the right side of the first electrical connection portion 2, the second electrical connection portion 3 and the third electrical connection portion 4.

In accordance with the embodiment, the cable connector further includes a printed circuit board. A lower portion of the printed circuit board extends downwards to form an integrated plugboard portion; and the first electrical connection portion 2, the second electrical connection portion 3 and the third electrical connection portion 4 are arranged on the plugboard portion at an interval.

Specifically, the cable connector in the embodiment is smaller in size and more compact in structure. The first electrical connection portion 2, the second electrical connection portion 3 and the third electrical connection portion 4 are arranged on one plugboard portion, correspondingly, the stable plugging may be achieved by using only one plugging portion and one first positioning portion 5.

Sixth Embodiment

Figure 12:
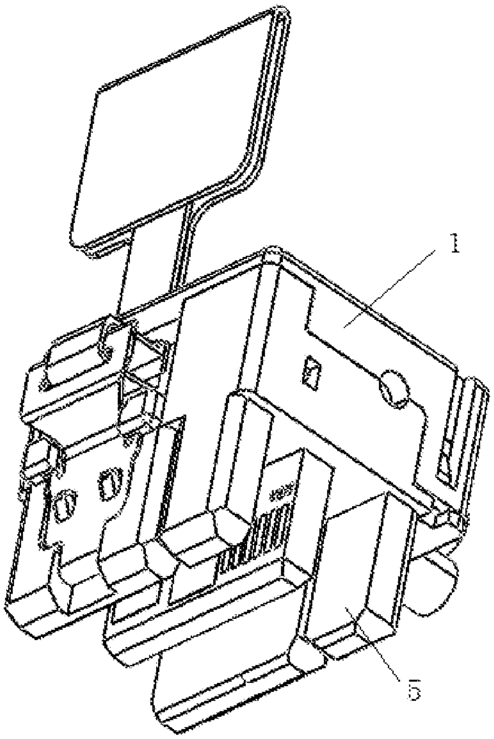
FIG. 12 shows a schematic diagram of a three-dimensional structure of a cable connector in accordance with a sixth embodiment of the present invention.

As shown in FIG. 12, the difference between the embodiment and the fifth embodiment is as follows:

In accordance with the embodiment, there is a pair of plugging portions and a pair of first positioning portions 5, respectively.

Specifically, to further improve the plugging strength and stability of the cable connector, the plugging portion and the first positioning portion 5 may be arranged pairwise. One pair of plugging portions are respectively arranged on both sides of the plugging portion, and one pair of first positioning portions 5 are respectively arranged on both sides of the plugboard portion.

Figure 13:
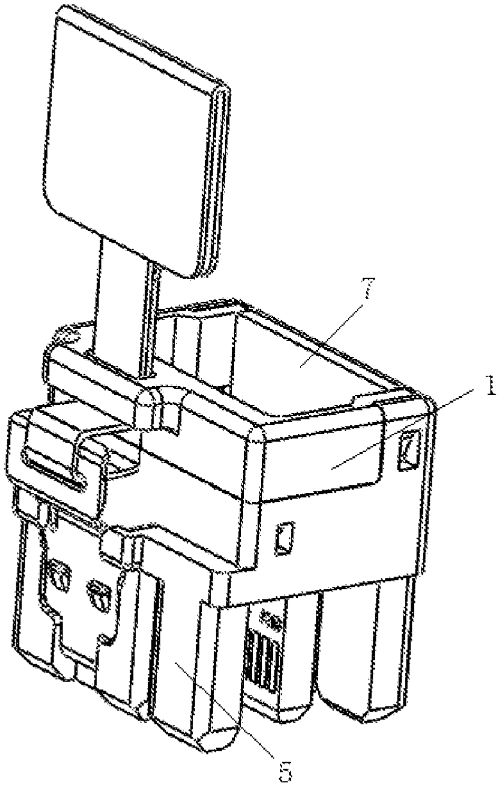
FIG. 13 shows a schematic diagram of a three-dimensional structure of another cable connector in accordance with a sixth embodiment of the present invention.
Figure 14:
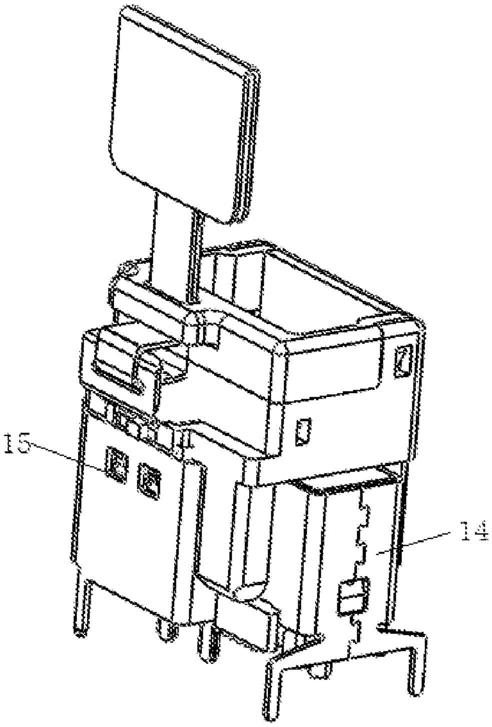
FIG. 14 shows a schematic diagram of a three-dimensional structure of a connector assembly in accordance with a sixth embodiment of the present invention.

Furthermore, as shown in FIG. 13, in the cable connector in the embodiment, the cable outlet 7 may be formed in the top of the first insulator 1. The cable connector in the embodiment may be in plug-fit with the corresponding board connector thereof to form a connector assembly as shown in FIG. 14.

The embodiments of the present invention have been described above, and the foregoing description is illustrative, not limiting, and not limited to the disclosed embodiments. Numerous modifications and changes will be apparent to those skilled in the art without departing from the scope and spirit of the illustrated embodiments.

What is claimed is:

1. A cable connector, comprising:

a first insulator, wherein a first electrical connection portion, a second electrical connection portion and a third electrical connection portion are sequentially arranged in the first insulator in a length direction thereof; the first electrical connection portion, the second electrical connection portion and the third electrical connection portion are connected to a first cable, a second cable and a third cable, respectively; one of the first electrical connection portion, the second electrical connection portion and the third electrical connection portion is a power supply connection portion, and at least one of the first electrical connection portion, the second electrical connection portion and the third electrical connection portion is a signal connection portion;

the bottom of the first insulator is provided with a plugging portion and a first positioning portion extending downwards;

the plugging portion comprises a pair of first plugging portions and at least a pair of second plugging portions; the pair of first plugging portions are located on both sides of the first electrical connection portion and the second electrical connection portion, and each pair of second plugging portions are located at both sides of the third electrical connection portion;

and the first positioning portion is located between the first plugging portion and the second plugging portion.

2. The cable connector according to claim 1, wherein the plugging portion is plate-shaped, and the first positioning portion is columnar.

3. The cable connector according to claim 1, wherein a pair of plugging portions and a pair of first positioning portions are provided, respectively.

4. A connector assembly, comprising the cable connector according to claim 1 and a board connector.

5. The cable assembly according to claim 4, wherein the board connector comprises:

a second insulator, wherein a first terminal set, a second terminal set and a third terminal set are sequentially arranged in the second insulator in a length direction thereof, the first terminal set, the second terminal set and the third terminal set are in plug-fit with the first electrical connection portion, the second electrical connection portion and the third electrical connection portion, respectively; and a housing, sleeved outside the second insulator, wherein a plugging slot is formed between at least one of the front side face and the rear side face of the second insulator and the housing, at least part of the front end face and/or rear end face of the housing is recessed inwards to form a positioning slot, the plugging slot is in plug-fit with the plugging portion, and the positioning slot is in plug-fit with the first positioning portion.

6. The cable connector according to claim 1, wherein the first electrical connection portion is a power supply connection portion, and the second electrical connection portion is a sideband signal connection portion.

7. The cable connector according to claim 6, wherein the third electrical connection portion comprises at least one of a sideband signal connection portion and a differential signal connection portion.

8. The cable connector according to claim 1, wherein one side of the first insulator is provided with a cable outlet, and the first cable, the second cable and the third cable extend outwards via the cable outlet.

9. The cable connector according to claim 8, wherein at least the front side of the bottom of the first insulator is provided with the plugging portion, the plugging portion at the front side of the bottom of the first insulator is provided with a lock latch, and the lock latch is provided with a lock tab.

10. The cable connector according to claim 9, wherein the lock latch comprises a lock plate bent into a U shape, one face of the lock plate is clamped into a lock groove formed in the surface of the plugging portion, and the other face of the lock plate is a free end exposed to the outside; two lock tabs are arranged on the outer side of the other face of the lock plate, and the upper end of the other face of the lock plate is provided with a pull tab.

11. The cable connector according to claim 8, wherein the cable outlet is formed in the top of the first insulator.

12. The cable connector according to claim 1, further comprising a printed circuit board, wherein the lower portion of the printed circuit board extends downwards to form a first plugboard portion and a second plugboard portion, and a first clearance is provided between the first plugboard portion and the second plugboard portion; the first electrical connection portion and the second electrical connection portion are arranged on the first plugboard portion at an interval, and the third electrical connection portion is arranged on the second plugboard portion; there are at least two third electrical connection portions, and the at least two third electrical connection portions are spaced from each other; and a second clearance is provided between the adjacent third electrical connection portions.

13. The cable connector according to claim 12, wherein at least two pairs of second plugging portions are provided, and a third clearance is provided between the adjacent second plugging portions in a length direction of the first insulator.

14. The cable connector according to claim 13, wherein the front side face of the first insulator is provided with a protruded portion, the first plugging portion and the first positioning portion are located at the bottom of the protruded portion; and/or a fourth clearance is provided between the first positioning portion and the first plugging portion as well as between the first positioning portion and the second plugging portion.

15. The cable connector according to claim 14, wherein the bottoms of the left side face and the right side face of the first insulator are provided with second positioning portions extending downwards, a fifth clearance is provided between the second positioning portion and the plugging portion, and the second positioning portion is plate-shaped.

* * * * *